T. HASS.
ELECTRICAL LOW-WATER AND HIGH-PRESSURE ALARM.

No. 170,261. Patented Nov. 23, 1875.

UNITED STATES PATENT OFFICE.

THEODORE HASS, OF NEW YORK, N. Y.

IMPROVEMENT IN ELECTRICAL LOW-WATER AND HIGH-PRESSURE ALARMS.

Specification forming part of Letters Patent No. 170,261, dated November 23, 1875; application filed November 16, 1872.

*To all whom it may concern:*

Be it known that I, THEODORE HASS, of the city, county, and State of New York, have invented certain novel and useful Improvements in Alarms for Steam - Boilers, operated by means of electricity; and I hereby declare the following to be a full, clear, and exact description thereof, reference being had to the accompanying drawings, which are lettered to correspond with and form a part of the specification.

Figure 1:
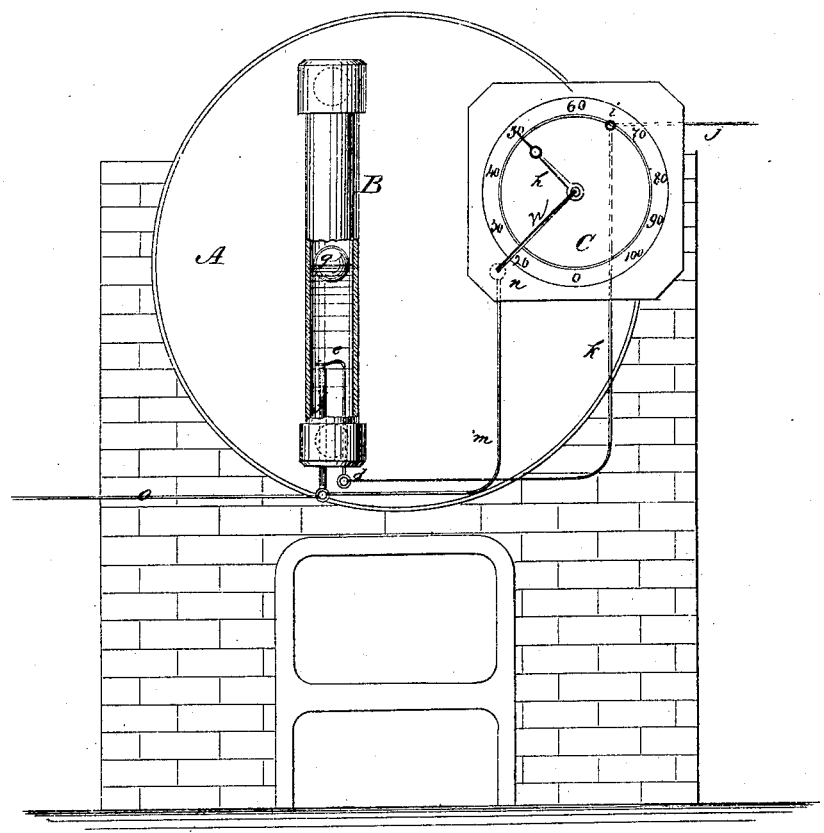
Figure 2:
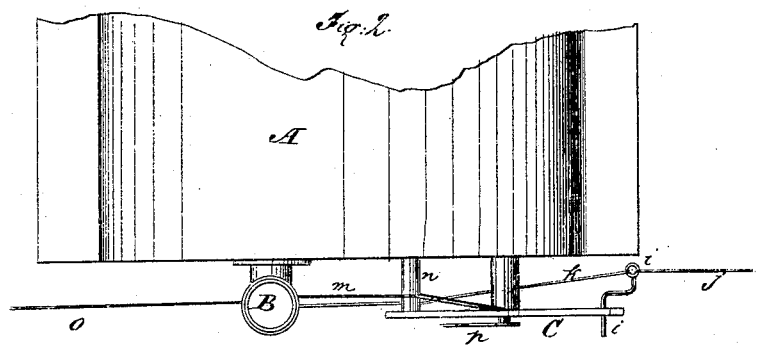

To enable those skilled in the art to construct and operate the same, I will describe it as follows, to wit:

Figure 1 represents a front-end view of an ordinary steam-boiler, A, showing the water-gage B, with ball-float $g$ and spring $e$, and steam-gage C, with conducting-wires $f$ $d$ $m$ $k$ to the battery through conducting-wire J, and through conducting-wire $o$ to the alarm-bell. Fig. 2 is a section of the side elevation of the boiler A, showing the water-gage B, steam-gage C, index P, wire or insulated pin $i$, conducting-wires $k$ and $m$, and conducting-wire $o$ to the bell, also the conducting-wire J to the battery.

The conducting-wire $d$, referred to in Fig. 1, is made of platinum, and as it passes through the bottom of the glass water-gage it becomes insulated. The top of this wire is provided with a bent platinum spring, $e$, at its top end, (see Fig. 1,) which also shows the connecting-wire $f$, or opposite pole of the battery, which is also insulated as it passes through the bottom of the glass water-gage B, its top end being in close proximity to the spring $e$, which forms a part of the connecting-wire $d$. The ball or float $g$ rests or floats upon the surface of the water in the glass gage B. The wires $m$ and $k$ are connected with the battery J and the alarm-bell $o$ by means of the connecting-wires $m$ and $k$, as shown in the accompanying drawings.

The wires $f$ and $d$ are adjustable, so that the alarm will be given when the float $g$ in the tubular gage rests upon the top of the electric spring $e$, and by the weight of said float the spring is forced down upon the top end of the connecting-wire $f$, thereby closing the electric circuit. These insulated platinum wires $d$ and $f$ are much stronger conductors of the electric current than the small quantity of water remaining in the glass tube B below the spring $e$; consequently, the alarm is sounded as soon as the circuit is closed by the falling of the ball $g$ upon the spring $e$, which forms a part of the wire $d$.

Pin $i$ passes through the face or dial of the steam indicator or gage C to the connecting-wire J, through which it is connected to the battery. The said pin $i$ is covered with a vulcanized rubber jacket or tube, by which means it is entirely insulated. The index or hand upon the dial of the steam-gage is connected to the conducting-wire $m$, which is united to the conducting-wires $f$ and $o$, through which means a connection is formed with the alarm-bell.

The dial may be graduated to indicate any desired pressure of steam. For instance, in the present application sixty-five pounds to the square inch is considered dangerous; consequently when the index or hand P reaches sixty-five it comes in contact with the insulated pin $i$, and completes the electric circuit through the above connecting-wires J, $m$, and $o$, when the alarm will sound.

Having described the individual parts of my invention, and the mechanical arrangement and combination thereof, I will state that the novelty of my invention does not consist in the construction of water gages or indicators, or steam-dials with index; but it consists in a new circuit-closer for a water-alarm by the application of two conductors, $f$ and $d$, one of which rods is provided at its top end with a spring, $e$, projecting over and adjacent to the top end of the other conductor, to be operated with the ball-float within a gage-tube; also, the combination, with the low-water alarm-circuit $o$, $f$, $d$, $k$, $i$, and $j$, which passes through the low-water indicator, of the branch circuit $m$ $n$, and connects through the pressure-indicator needle, so as to produce an alarm independently of the water-alarm circuit. Therefore,

What I claim as new and useful, and wish to protect by Letters Patent of the United States, is—

1. The circuit-closer for low-water indicators or alarms, consisting of the two conductors $f$ and $d$, one of which is terminated in a spring, $e$, lying over and adjacent to the top of the other, and the ball-float $g$, arranged within a gage-tube, substantially as above set forth.

2. The combination, with the low-water alarm circuit $o f d k i j$, passing through the low-water indicator, of the branch circuit $m n$, connecting through the pressure-indicator needle, and operating an alarm independently of the water-alarm circuit, substantially as and for the purpose set forth.

In testimony whereof I hereunto subscribe my name in the presence of two witnesses.

TH. HASS.

Witnesses:
   W. BUSHELL,
   JAMES P. McLEAN.